United States Patent
Clark et al.

(10) Patent No.: US 10,989,059 B2
(45) Date of Patent: Apr. 27, 2021

(54) CMC BOAS ARRANGEMENT

(71) Applicant: United Technologies Corporation, Farmington, CT (US)

(72) Inventors: Thomas E. Clark, Sanford, ME (US); William M. Barker, North Andover, MA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 85 days.

(21) Appl. No.: 16/380,506

(22) Filed: Apr. 10, 2019

(65) Prior Publication Data

US 2020/0325789 A1   Oct. 15, 2020

(51) Int. Cl.
F01D 11/00 (2006.01)
F02K 3/06 (2006.01)

(52) U.S. Cl.
CPC ............. F01D 11/005 (2013.01); F02K 3/06 (2013.01); *F05D 2220/323* (2013.01); *F05D 2240/56* (2013.01); *F05D 2300/6033* (2013.01)

(58) Field of Classification Search
CPC .......... F01D 11/005; F01D 11/08; F02K 3/06; F05D 2220/323; F05D 2240/56; F05D 2240/57; F05D 2300/6033
See application file for complete search history.

(56) References Cited

U.S. PATENT DOCUMENTS

| 4,596,116 | A |   | 6/1986 | Mandet |   |
|---|---|---|---|---|---|
| 5,344,284 | A | * | 9/1994 | Delvaux | F01D 11/22 415/173.2 |
| 9,079,245 | B2 |   | 7/2015 | Durocher et al. |   |
| 9,863,264 | B2 | * | 1/2018 | Kulkarni | F01D 25/246 |
| 10,024,193 | B2 | * | 7/2018 | Shapiro | F01D 25/246 |
| 10,100,659 | B2 | * | 10/2018 | Lamusga | F01D 11/08 |
| 10,465,558 | B2 | * | 11/2019 | Shapiro | F01D 25/246 |
| 10,494,940 | B2 | * | 12/2019 | Liebl | F01D 5/02 |
| 2005/0271505 | A1 |   | 12/2005 | Alford |   |
| 2013/0051989 | A1 |   | 2/2013 | Durocher et al. |   |
| 2013/0170963 | A1 | * | 7/2013 | Mironets | F01D 5/14 415/173.1 |
| 2016/0061330 | A1 |   | 3/2016 | Davis |   |
| 2017/0328228 | A1 |   | 11/2017 | Ruthemeyer et al. |   |

(Continued)

FOREIGN PATENT DOCUMENTS

| EP | 2514925 | 10/2012 |
|---|---|---|
| EP | 3106630 | 12/2016 |
| FR | 3041994 | 4/2017 |

OTHER PUBLICATIONS

Extended EP Search Report for EP Application No. 20168758.9 dated Sep. 2, 2020.

*Primary Examiner* — Nathaniel E Wiehe
*Assistant Examiner* — Ryan C Clark
(74) *Attorney, Agent, or Firm* — Carlson, Gaskey & Olds, P.C.

(57) ABSTRACT

A blade outer air seal includes a base portion that extends between a first circumferential side and a second circumferential side and from a first axial side to a second axial side. A first hook extends from the base portion and circumferentially spaced from a second hook. The first and second hooks extend along an axial length of the base portion. The first circumferential side has a protrusion and the second circumferential side has a groove.

20 Claims, 7 Drawing Sheets

(56) References Cited

U.S. PATENT DOCUMENTS

2017/0335705 A1\* 11/2017 Tyler, Jr. ................ F01D 11/02
2018/0230839 A1   8/2018 Gallier et al.
2020/0131921 A1\* 4/2020 Johnson ............... F01D 25/246

\* cited by examiner

CMC BOAS ARRANGEMENT

BACKGROUND

This application relates to a ceramic matrix composite blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY

In one exemplary embodiment, a blade outer air seal includes a base portion that extends between a first circumferential side and a second circumferential side and from a first axial side to a second axial side. A first hook extends from the base portion and circumferentially spaced from a second hook. The first and second hooks extend along an axial length of the base portion. The first circumferential side has a protrusion and the second circumferential side has a groove.

In a further embodiment of the above, the base portion extends aft of the axial length.

In a further embodiment of any of the above, the protrusion and the groove extend along the axial length.

In a further embodiment of any of the above, the first and second hooks extend circumferentially inward toward one another.

In a further embodiment of any of the above, the blade outer air seal is formed from a ceramic material.

In another exemplary embodiment, a turbine section for a gas turbine engine includes a turbine blade that extends radially outwardly to a radially outer tip and for rotation about an axis of rotation. A blade outer air seal has a plurality of segments mounted in a support structure via a carrier. The plurality of segments are arranged circumferentially about the axis of rotation and radially outward of the outer tip. Each seal segment has a base portion that extends between a first circumferential side and a second circumferential side and from a first axial side to a second axial side. A first hook extends from the base portion and circumferentially spaced from a second hook. The first and second hooks extend along an axial length of the base portion. The first circumferential side has a protrusion and the second circumferential side has a groove.

In a further embodiment of any of the above, the carrier has an axially extending platform that is configured to engage the first and second hooks.

In a further embodiment of any of the above, the carrier has first and second tabs extending circumferentially from the platform.

In a further embodiment of any of the above, the carrier has a first carrier hook that is engaged with the support structure.

In a further embodiment of any of the above, the first carrier hook extends circumferentially.

In a further embodiment of any of the above, the carrier has a second carrier hook that is engaged with the support structure. The second carrier hook is axially spaced from the first carrier hook.

In a further embodiment of any of the above, the protrusion of each seal segment is engaged with the groove of an adjacent seal segment.

In a further embodiment of any of the above, a brush seal is arranged along a trailing edge of the seal segment and carrier.

In a further embodiment of any of the above, a wear liner is arranged between the carrier and the brush seal.

In a further embodiment of any of the above, a vane platform is engaged with a forward side of the carrier and the seal segment.

In a further embodiment of any of the above, a spring seal is arranged between each of the plurality of segments. The spring seal extends in an axial direction.

In a further embodiment of any of the above, the spring seal is arranged within the groove of each seal segment.

In a further embodiment of any of the above, the spring seal is generally S shaped.

In a further embodiment of any of the above, the carrier is formed from a metallic material.

In a further embodiment of any of the above, the seal segment is formed from a ceramic material.

DETAILED DESCRIPTION

Figure 1:
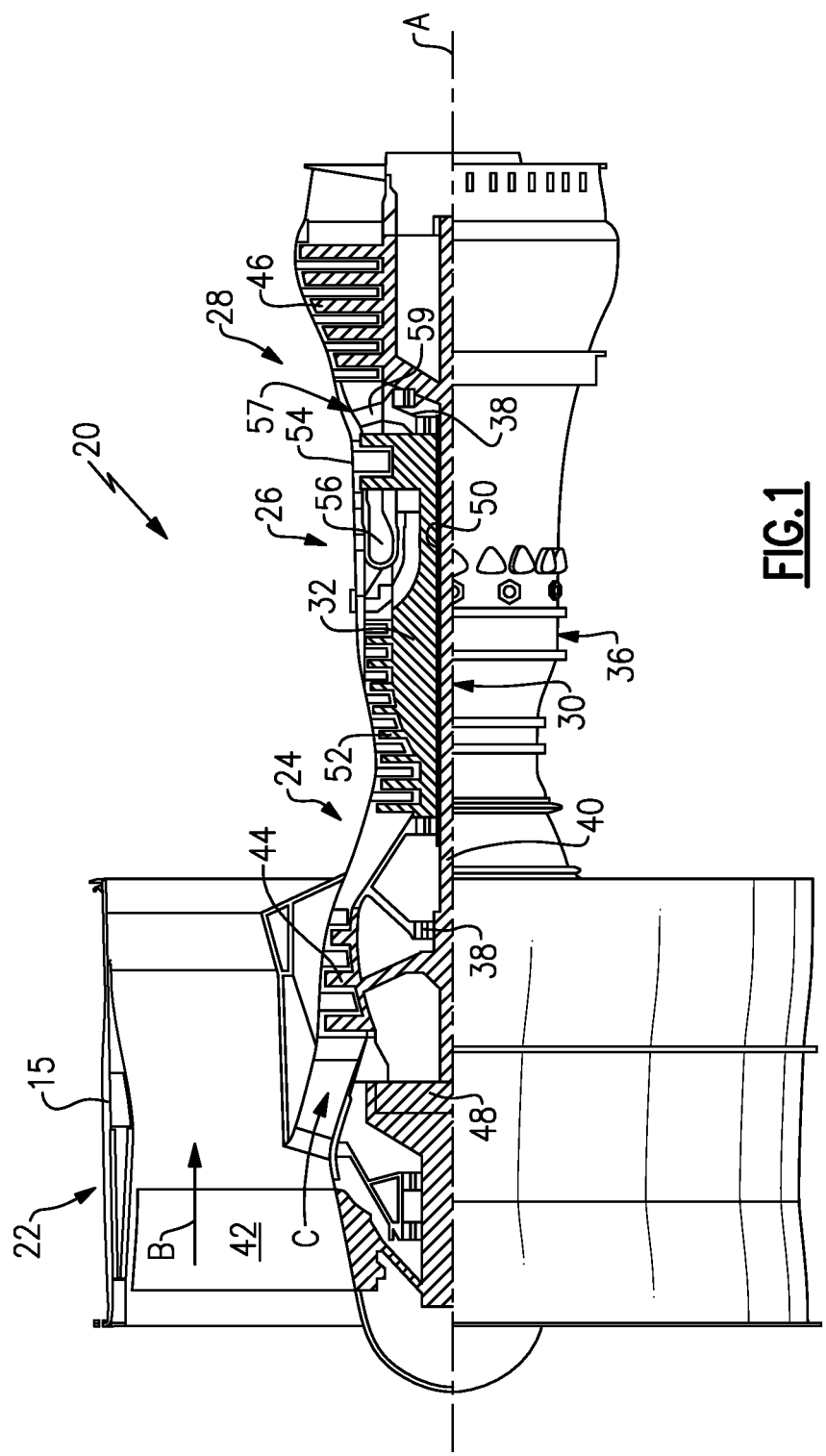
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
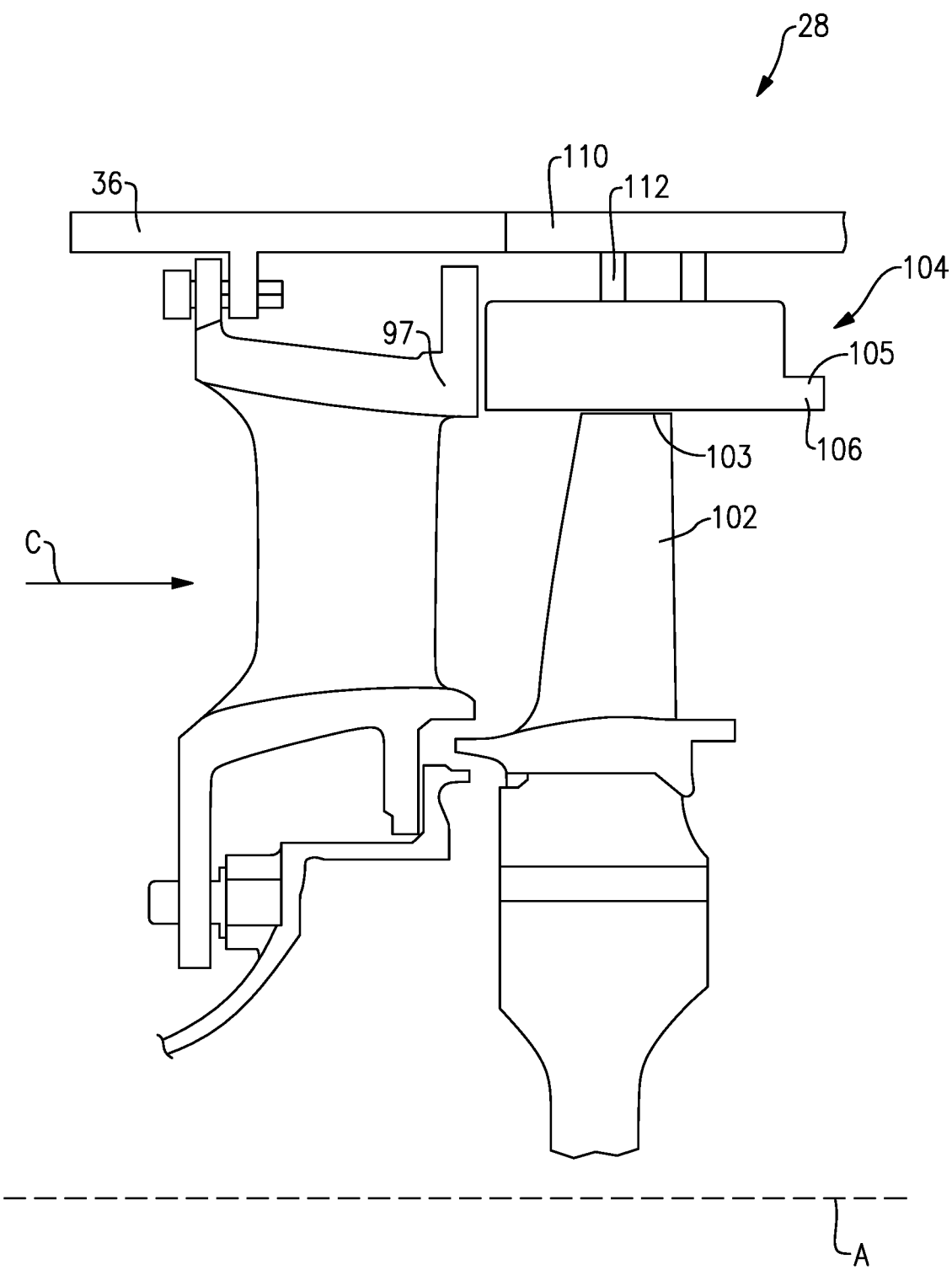
FIG. 2 shows an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a high thermal-resistance, low-toughness material, such as a ceramic matrix composite ("CMC").

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
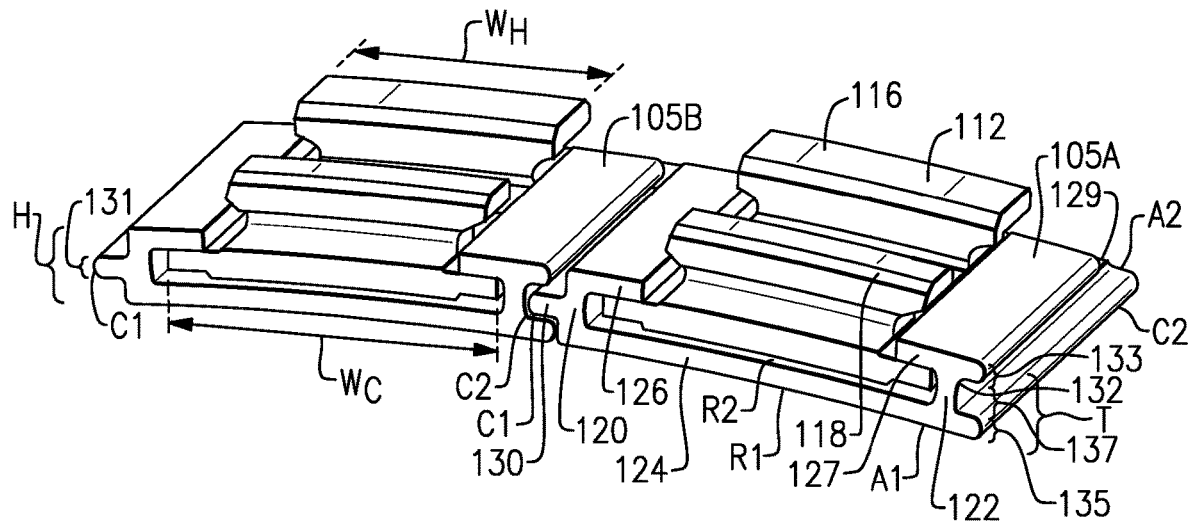
FIG. 3 shows a portion of an exemplary blade outer air seal assembly.

FIG. 3 shows a portion of an example BOAS assembly 104. The assembly 104 includes a seal segments 105 mounted on a carrier 112. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 and a second wall 122 that extend radially outward from a base portion 124. The first and second walls 120, 122 extend along the base portion 124 in a generally axial direction, and are circumferentially spaced from one another. The base portion 124 extends between the first and second axial sides A1, A2 and defines a gas path on a radially inner side and a non-gas path on a radially outer side. In this disclosure, forward, aft, upstream, downstream, axial, radial, or circumferential is in relation to the engine axis A unless stated otherwise. The base portion 124 may extend axially forward and/or aft of the first and second walls 120, 122, and provides a surface for sealing of the BOAS first and second axial sides A1, A2. For example, the base portion 124 includes a portion 129 axially aft of the first and second walls 120, 122 for engagement with a seal 160 (shown in FIG. 4). That is, the walls 120, 122 extend less than the full length of the seal segment 105 in the axial direction.

The walls 120, 122 include hooks 126, 127, respectively at a radially outermost portion. The hooks 126, 127 extend circumferentially inward towards one another. The hooks 126, 127 are configured to secure the seal segment 105 to the carrier 112. The hooks 126, 127 extend towards the matefaces, or first and second circumferential sides C1, C2.

The carrier 112 has a platform 118 with axially extending hooks 114, 116. The hooks 114, 116 extend radially outward from the platform 118 for attaching the carrier 112 and seal segment 105 to the support structure 110. A portion of the platform 118 engages with the hooks 126, 127. The platform 118 is generally parallel to the base portion 124 of the seal segment 105. In an example, the platform 118 of the carrier 112 has a width $W_C$ in the circumferential direction. The carrier hooks 114, 116 have a width $W_H$ in the circumferential direction. The width $W_C$ is greater than the width $W_H$ to permit the platform 118 to engage with the hooks 126, 127 of the seal segment 105. In the illustrated example, the hooks 126, 127 extend in a direction perpendicular to the walls 120, 122. In other examples, the hooks 126, 127 may extend at an angle relative to the walls 120, 122. The axially extending hooks 126, 127 provide engagement with the carrier 112 along all or most of the axial length of the carrier 112. The carrier hooks 114, 116 extend generally perpendicular to the seal segment hooks 126, 127. That is, the carrier hooks 114, 116 extend generally circumferentially, while the seal segment hooks 126, 127 extend generally axially.

In some examples, a wear liner may be arranged between the seal segment 105 and the carrier 112. The wear liner may be a metallic material such as cobalt, for example. The wear liner may be formed from sheet metal. The carrier 112 may be segmented, with each segment engaged with a seal segments 105.

The first and second circumferential sides C1, C2 are configured to mate with adjacent seal segments 105. In the illustrated example, the first circumferential side C1 of each seal segment 105A, 105B has a protrusion 130 extending circumferentially outward from the seal segment 105. The second circumferential side C2 of each seal segment 105A, 105B has a groove 132 extending circumferentially inward toward the seal segment 105. The protrusion 130 of a seal segment 105A is configured to engage with the groove 132 of an adjacent seal segment 105B. The protrusion 130 and groove 132 may extend along an axial length of the first and second walls 120, 122. The protrusion 130 and groove 132 provide sealing between the first and second circumferential sides C1, C2 of each seal segment 105A, 105B.

In one example, the protrusion 130 has a height 131, and the groove has a height 137. The height 137 is greater than the height 131. The groove 132 forms an inner portion 135 and an outer portion 133 of the second wall 122. The second circumferential side C2 has a thickness T, which includes the inner and outer portions 135, 133, and the groove 132. The first circumferential side C1 has a thickness H. In some examples, the thickness H is the same as the thickness T. The thicknesses H and T may be between about 0.04 and 0.15 inches (1.016-3.81 mm), for example.

The BOAS 106 may be formed of a ceramic matrix composite ("CMC") material. Each seal segment 105 is formed of a plurality of CMC laminates. The laminates may be silicon carbide fibers, formed into a braided or woven fabric in each layer. The fibers may be coated by a boron nitride. In other examples, the BOAS 106 may be made of a monolithic ceramic.

CMC components such as BOAS segments 105 are formed by laying fiber material, such as laminate sheets or braids, in tooling, injecting a infiltrant into the tooling, and curing to form a solid composite component. The component may be densified by adding additional material to further stiffen the laminates.

In an embodiment, the BOAS segment 105 is formed from fiber material such as silicon carbide (SiC) braids. In one example, the protrusion 130 and groove 132 are integrally formed from the construction. The protrusion 130 and groove 132 may be formed by wrapping braided plies about a mandrel, then pressing the laminates in the axial direction to form the protrusion 130 and groove 132 in one example. In another example, the protrusion 130 and groove 132 may be formed using inner and outer molds that form the protrusion 130 and groove 132.

Figure 4:
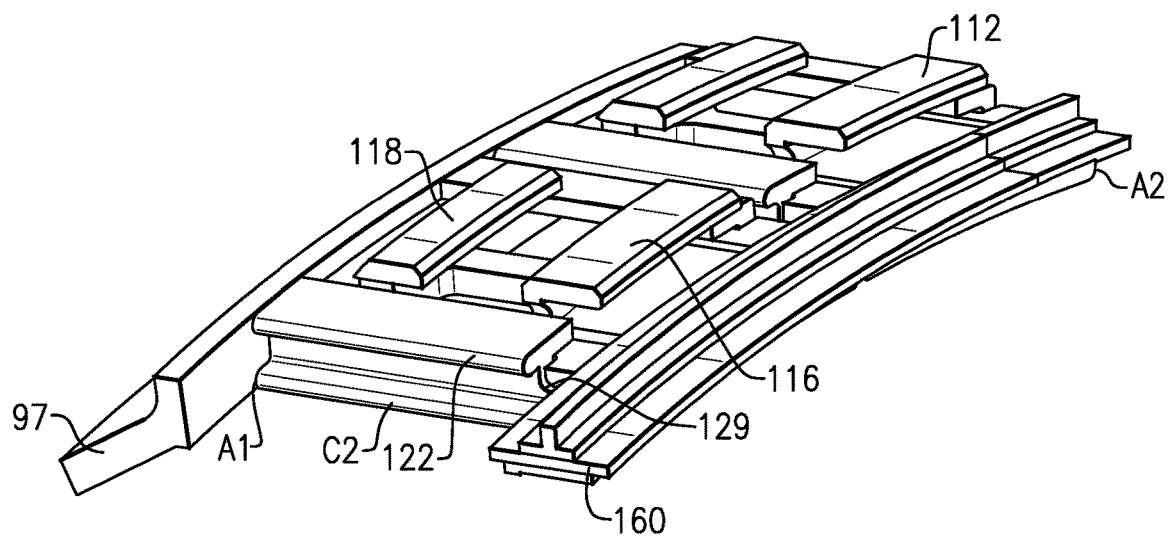
FIG. 4 shows a portion of the exemplary blade outer air seal assembly.

FIG. 4 is a portion of the BOAS assembly 104. In this example, the first axial side A1 is engaged with a portion of a vane 97. A brush seal 160 may be arranged near the second circumferential side A2. The portion 129 aft of the first and second walls 120, 122 is in engagement with the brush seal 160. A portion of the platform 118 may also be in engagement with the brush seal 160 and the portion of the vane 97.

Figure 5:
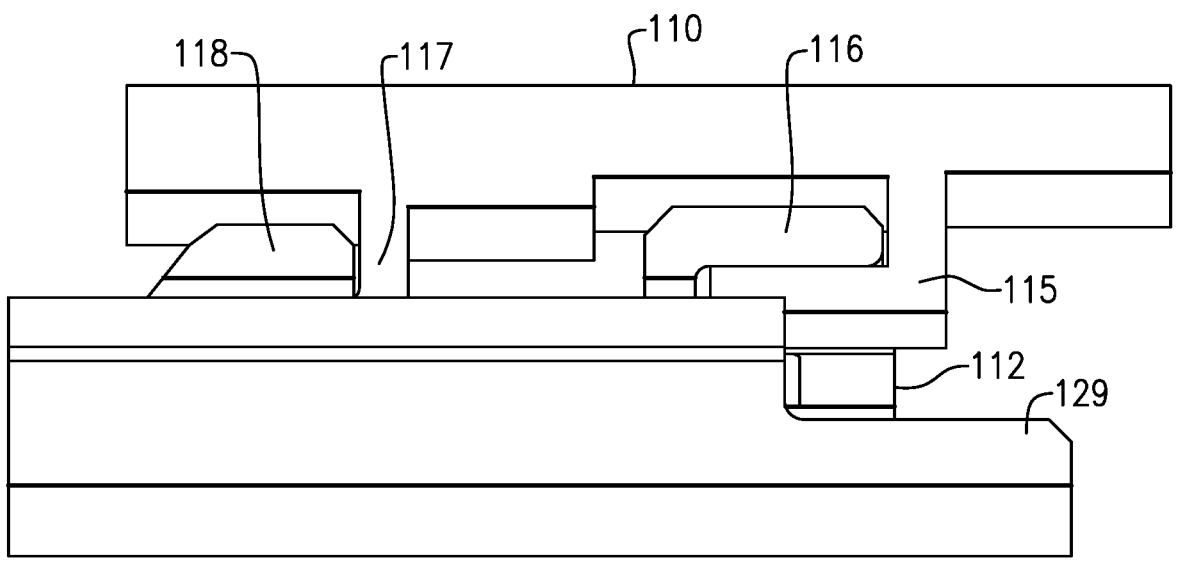
FIG. 5 shows a portion of the exemplary blade outer air seal assembly.

FIG. 5 is a portion of the BOAS assembly 104 with the support structure 110. The support structure 110 may have hooks 115, 117 that extend radially inward and are configured to engage with the first and second hooks 114, 116 of the carrier 112. In the illustrated embodiment, the hooks 114, 116 of the carrier 112 extend generally axially aft towards the second axial side A2. However, the hooks 114, 116 may have different orientations, such as extending in the opposite direction, so long as the hooks 114, 116 of the carrier 112 engage with the hooks 115, 117 of support structure 110.

Figure 6:
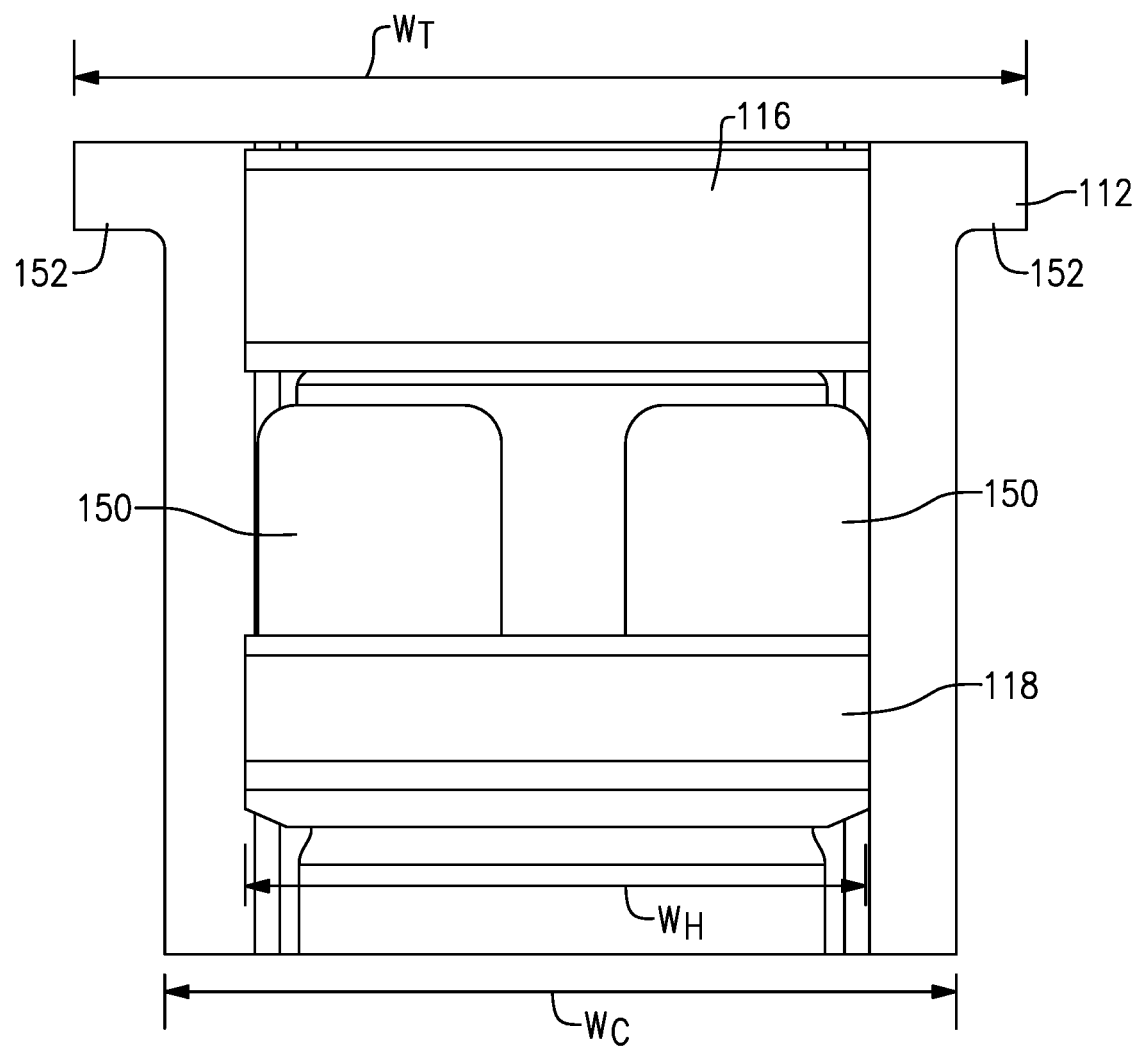
FIG. 6 shows an exemplary carrier for the blade outer air seal assembly.

FIG. 6 shows a top view of the carrier 112. A pair of tabs 152 extend circumferentially outward from the platform 118 at an aft portion of the carrier 112. The carrier 112 has a width $W_T$ at the tabs 152 that is greater than the width $W_C$. The tabs 152 are configured to engage with the first and second walls 120, 122 of the seal segment 105. The platform 118 may have holes 150 that extend through the platform 118. The holes 150 may provide passage for cooling fluid to pass through the carrier 112. The holes 150 may also provide weight reduction for the carrier 112. Although two holes 150 are illustrated, more or fewer holes 150 may be provided. Although the illustrated holes 150 are a rounded rectangle shape, other hole shapes may be used.

Figure 7:
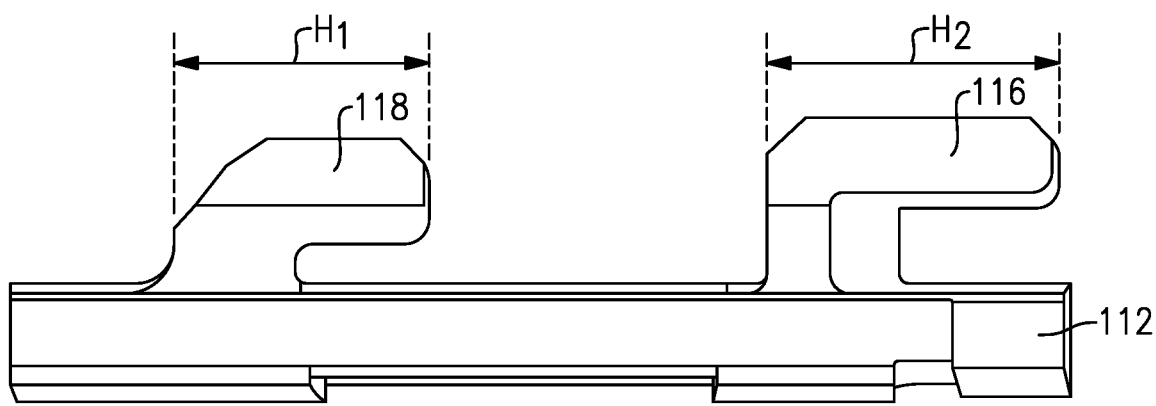
FIG. 7 shows an exemplary carrier for the blade outer air seal assembly.

FIG. 7 shows a side view of the carrier 112. The hook 114 has a width in the axial direction $H_1$ and the hook 116 has a width in the axial direction $H_2$. In some examples, the widths $H_1$ and $H_2$ are about the same. In other examples, the width $H_2$ is greater than the width $H_1$. The hook 116 may have a greater height in the radial direction than the hook 114 to engage with the support structure 110. The platform 118 has a substantially uniform thickness. The carrier 112 may be formed from cast metal alloy, such as cobalt or nickel, for example.

Figure 8:
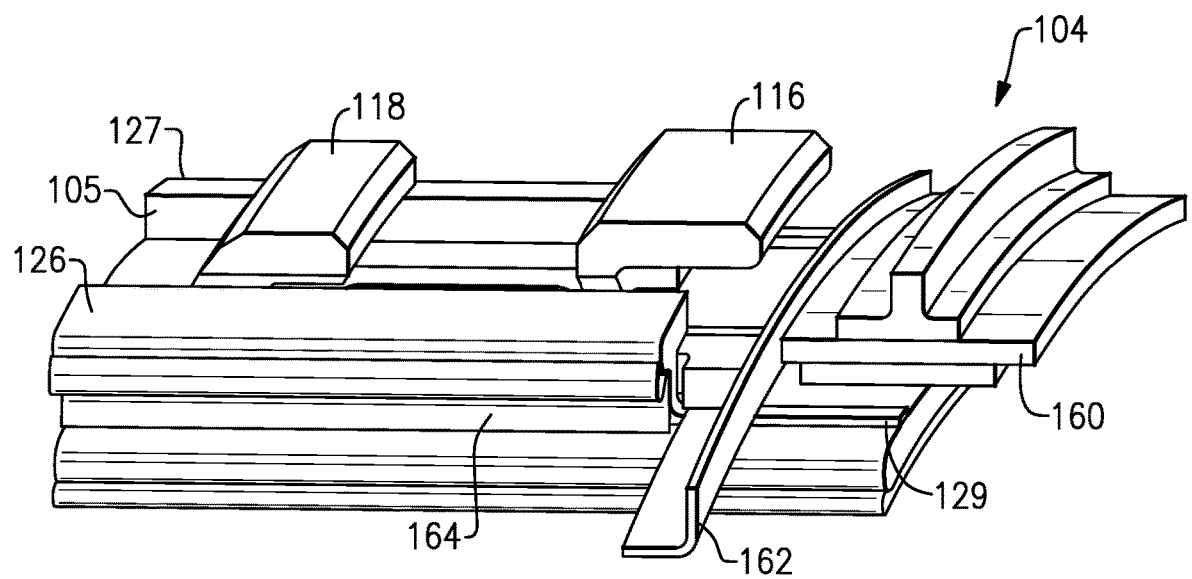
FIG. 8 shows a portion of the exemplary blade outer air seal assembly.

FIG. 8 shows a portion of the BOAS assembly 104. The brush seal 160 is arranged at the portion 129 of the BOAS segment 105. In some examples, a wear liner 162 is arranged between the brush seal 160 and the carrier 112. The wear liner 162 may be a metallic material such as cobalt, for example. The wear liner 162 may be formed from sheet metal. The wear liner 162 and brush seal 160 extend circumferentially about the engine axis A. A spring seal 164 may be arranged along the first and second circumferential sides C1, C2 of the seal segment 105. The spring seal 164 extends axially. The spring seal 164 is arranged between the protrusion 130 and the groove 132 between adjacent seal segments 105. The spring seal 164 may be formed from a metallic material, such as a cobalt alloy. In one example, the spring seal 164 has a thickness of about 0.010 to about 0.030 inches (0.254-0.762 mm). In a further example, the spring seal 164 has a thickness of about 0.020 inches (0.508 mm).

Figure 9:
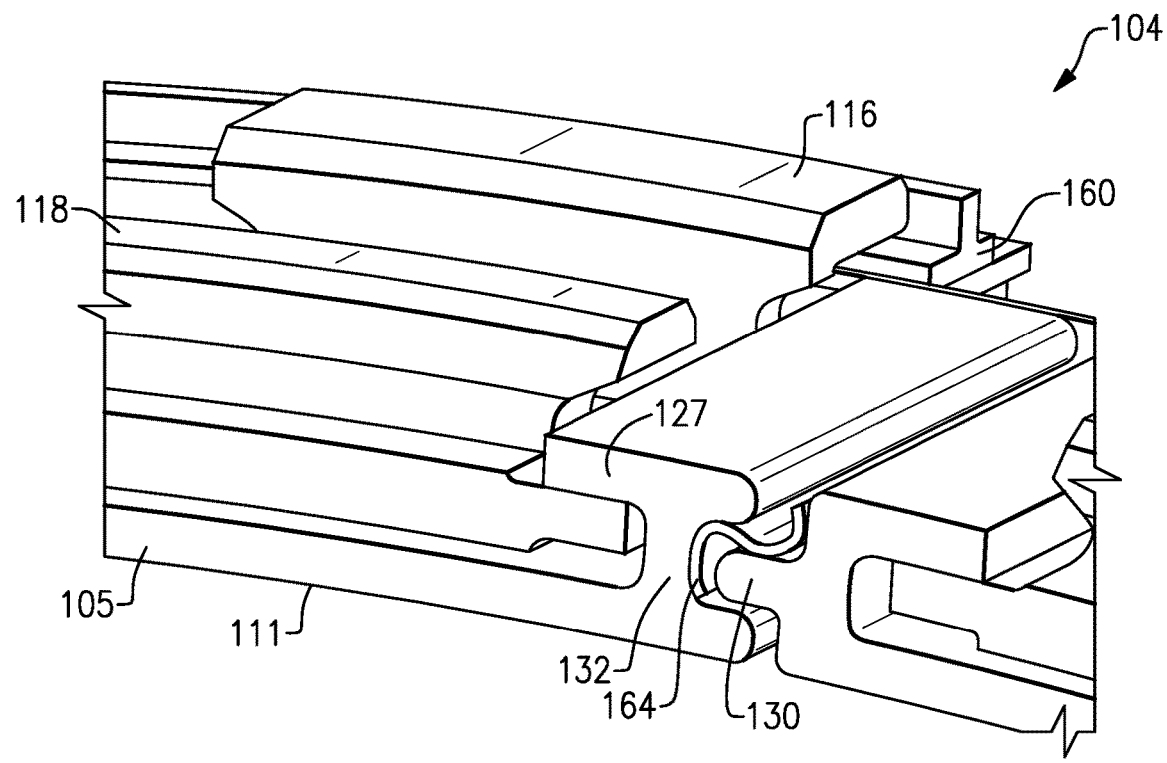
FIG. 9 shows a portion of the exemplary blade outer air seal assembly.

FIG. 9 shows a portion of the BOAS assembly 104. The spring seal 164 is generally "S" shaped, and provides three points of contact between the protrusion 130 and the groove 132. In an example, the spring seal 164 is compressed during insertion, and expands in the final assembly to provide the three points of contact that provide a seal between adjacent seal segments 105. A gap 142 may be formed between the first and second circumferential sides C1, C2 of adjacent seal segments 105A, 105B to receive the spring seal 164. In one embodiment, the gap 142 is about 0.01 inches to about 0.03 inches (0.254-0.762 mm).

Figure 10:
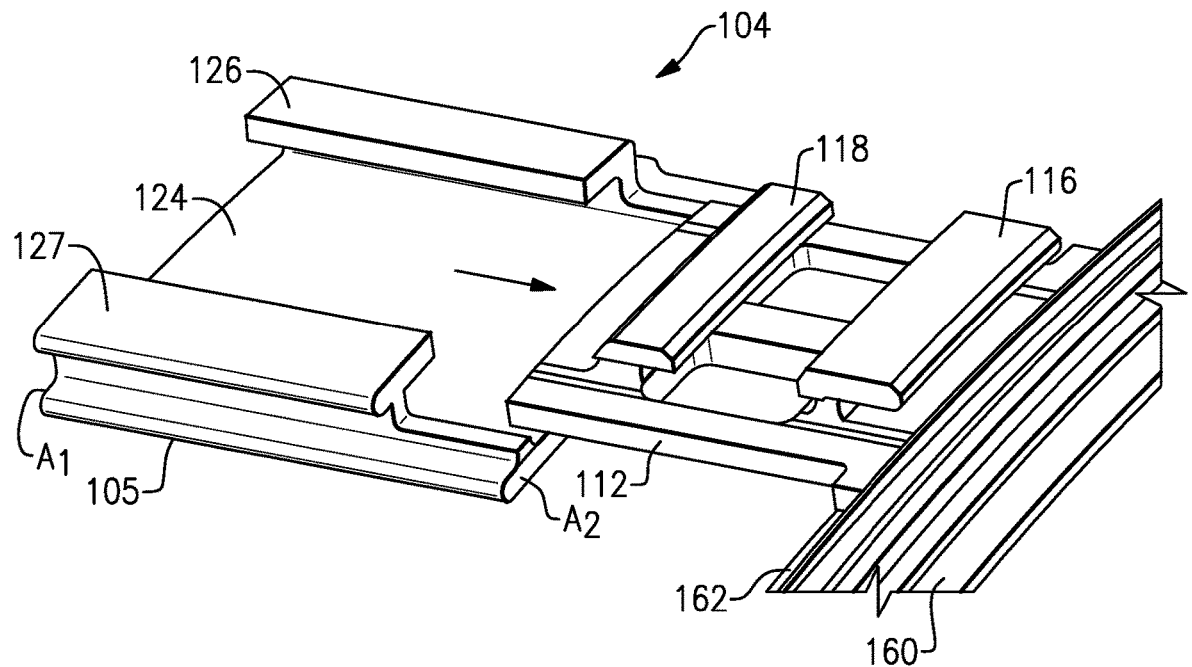
FIG. 10 shows a method step of assembling a blade outer air seal assembly.

FIG. 10 shows a method step of assembling a BOAS assembly 104. First, the carrier 112 is mounted to the brush seal 160. In some embodiments, the wear liner 162 is arranged between the carrier and the brush seal 160. Then, the BOAS segment 105 is slid onto the carrier 112. In this example, the seal segment 105 is slid axially aft, such that the second axial side A2 comes into engagement with the brush seal 160 or wear liner 162. The platform 118 of the carrier fits within the hooks 126, 127 of the seal segment 105, such that the platform 118 is adjacent the base portion 124 of the seal segment 105. This arrangement permits axial assembly of the BOAS assembly 104.

Figure 11:
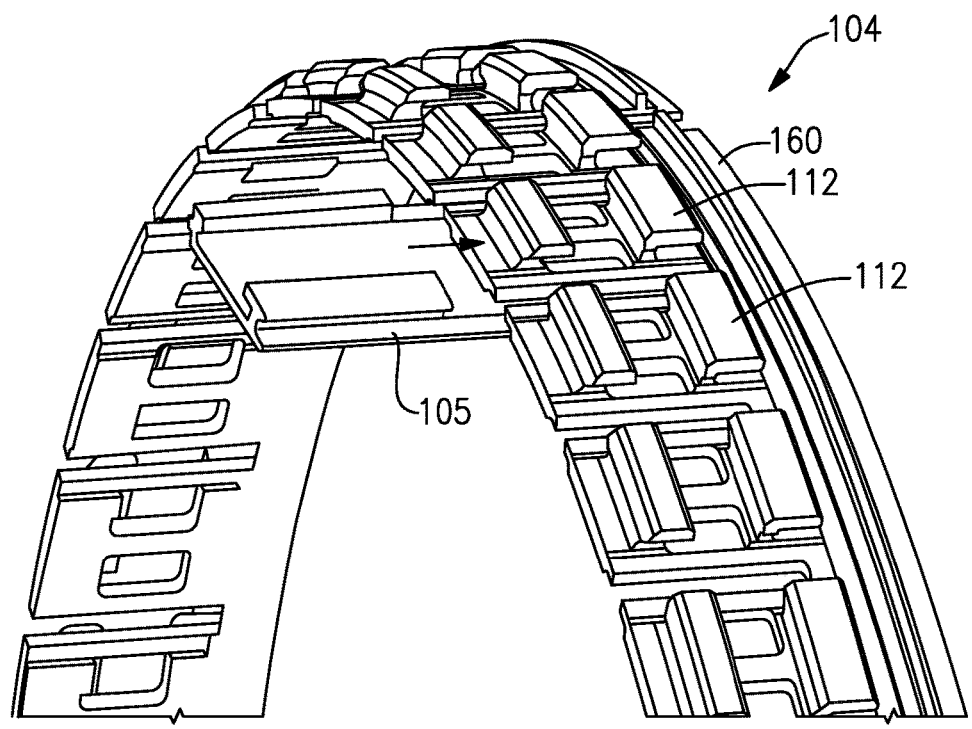
FIG. 11 shows a method step of assembling a blade outer air seal assembly.

FIG. 11 shows a BOAS assembly 104. A plurality of carrier segments 112 are arranged circumferentially about the engine axis A. In an embodiment, the brush seal 160 is segmented, with each brush seal segment extending across several carrier segments 112. A BOAS segment 105 is mounted onto each carrier segment 112 around the engine axis A. There are the same number of BOAS segments 105 as carrier segments 112.

Some known BOAS arrangements are complex to assemble and take up a lot of room in the radial direction. The disclosed assembly provides a carrier and seal segment that can be independently assembled into a support structure. Further, the carrier can be used with existing support structures without needing to modify the hook arrangement. The disclosed assembly provides a low profile in the radial direction, which may be assembled into known legacy turbine cases.

The disclosed BOAS segment 105 further includes a protrusion and groove arrangement for improved sealing between segments. This arrangement prevents a straight path to the gas path for improved sealing. This arrangement may also provide radiative and convective cooling, reducing the conducted temperature into the metallic carrier. The arrangement further permits a spring-seal to be used as an alternative to known planar featherseals. The carrier may further act as a heatshield, preventing any direct radiation from the BOAS segments 105 to the support structure 110 or the turbine outer case.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal, comprising:
a base portion extending between a first circumferential side and a second circumferential side and from a first axial side to a second axial side, a first hook extending from the base portion and circumferentially spaced from a second hook extending from the base portion, the first and second hooks extending along the base portion in an axial direction, wherein the first and second hooks extend circumferentially inward toward one another, wherein the first circumferential side has a protrusion and the second circumferential side has a groove.

2. The blade outer air seal of claim 1, wherein the base portion extends aft of the first ad second hooks in the axial direction.

3. The blade outer air seal of claim 1, wherein the protrusion and the groove extend along the axial length.

4. The blade outer air seal of claim 1, wherein the blade outer air seal is formed from a ceramic material.

5. A turbine section for a gas turbine engine, comprising:
a turbine blade extending radially outwardly to a radially outer tip and for rotation about an axis of rotation;
a blade outer air seal having a plurality of segments mounted in a support structure via a carrier, the plurality of segments arranged circumferentially about the axis of rotation and radially outward of the outer tip;
each seal segment having a base portion extending between a first circumferential side and a second circumferential side and from a first axial side to a second axial side, a first hook extending from the base portion and circumferentially spaced from a second hook, the first and second hooks extending along an axial length of the base portion, wherein the first and second hooks extend circumferentially inward toward one another, wherein the first circumferential side has a protrusion and the second circumferential side has a groove.

6. The turbine section of claim 5, wherein the carrier has an axially extending platform that is configured to engage the first and second hooks.

7. The turbine section of claim 6, wherein the carrier has first and second tabs extending circumferentially from the platform.

8. The turbine section of claim 5, wherein the carrier has a first carrier hook that is engaged with the support structure.

9. The turbine section of claim 8, wherein the first carrier hook extends circumferentially.

10. The turbine section of claim 8, wherein the carrier has a second carrier hook that is engaged with the support structure, the second carrier hook axially spaced from the first carrier hook.

11. The turbine section of claim 5, wherein the protrusion of each seal segment is engaged with the groove of an adjacent seal segment.

12. The turbine section of claim 5, wherein a brush seal is arranged along a trailing edge of the seal segment and carrier.

13. The turbine section of claim 12, wherein a wear liner is arranged between the carrier and the brush seal.

14. The turbine section of claim 5, wherein a vane platform is engaged with a forward side of the carrier and the seal segment.

15. The turbine section of claim 5, wherein a spring seal is arranged between each of the plurality of segments, the spring seal extending in an axial direction.

16. The turbine section of claim 15, wherein the spring seal is arranged within the groove of each seal segment.

17. The turbine section of claim 15, wherein the spring seal is generally S shaped.

18. The turbine section of claim 5, wherein the carrier is formed from a metallic material.

19. The turbine section of claim 5, wherein the seal segment is formed from a ceramic material.

20. The turbine section of claim 5, wherein a gap is formed between the first circumferential side and the second circumferential side.

\* \* \* \* \*

UNITED STATES PATENT AND TRADEMARK OFFICE
CERTIFICATE OF CORRECTION

PATENT NO. : 10,989,059 B2
APPLICATION NO. : 16/380506
DATED : April 27, 2021
INVENTOR(S) : Thomas E. Clark and William M. Barker It is certified that error appears in the above-identified patent and that said Letters Patent is hereby corrected as shown below:

In the Claims

In Claim 2, Column 8, Line 23; replace "first ad second" with --first and second--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*